United States Patent
Balasubramanian et al.

(10) Patent No.: US 9,891,890 B2
(45) Date of Patent: Feb. 13, 2018

(54) GENERATION OF AN APPLICATION FROM TEMPLATE

(71) Applicant: MICROSOFT TECHNOLOGY LICENSING, LLC, Redmond, WA (US)

(72) Inventors: Barath Balasubramanian, Bothell, WA (US); Evan Bjorn-Thomas Cohen, Seattle, WA (US); Olivier Colle, Bellevue, WA (US); William James Staples, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/936,045

(22) Filed: Nov. 9, 2015

(65) Prior Publication Data
US 2017/0131974 A1 May 11, 2017

(51) Int. Cl.
*G06F 9/44* (2006.01)
*G06F 3/0484* (2013.01)
*G06F 3/0482* (2013.01)

(52) U.S. Cl.
CPC .............. *G06F 8/20* (2013.01); *G06F 3/0482* (2013.01); *G06F 3/04842* (2013.01); *G06F 8/34* (2013.01)

(58) Field of Classification Search
CPC ................................................ G06F 8/30–8/38
USPC ........................................................ 717/106
See application file for complete search history.

(56) References Cited

U.S. PATENT DOCUMENTS

| | | | | |
|---|---|---|---|---|
| 6,330,006 B1 * | 12/2001 | Goodisman | ........... | G06F 9/4443 715/762 |
| 6,954,896 B1 * | 10/2005 | Dodrill | .................... | G10L 15/22 704/270 |
| 7,278,130 B2 * | 10/2007 | Iborra | ....................... | G06F 8/30 717/101 |
| 7,281,245 B2 * | 10/2007 | Reynar | ..................... | G06F 8/65 717/169 |
| 7,475,075 B2 * | 1/2009 | Lindhorst | ............. | G06F 9/4443 |
| 7,712,016 B2 * | 5/2010 | Jones | ...................... | G06F 17/24 715/200 |
| 7,886,222 B2 * | 2/2011 | Bagare | ..................... | G06F 8/10 715/234 |
| 7,954,046 B2 * | 5/2011 | Collie | ................. | G06F 17/2229 707/999.1 |

(Continued)

OTHER PUBLICATIONS

AppSheet—Basic Concepts—2016. https://appsheethelp.zendesk.com/hc/en-us.*

(Continued)

*Primary Examiner* — Francisco Aponte

(57) ABSTRACT

Examples of the disclosure provide for receiving a template at a design surface, the template representing a visual layout, logic, and data schema for an application. Received source data is bound to the template based on the data schema. At least one data storage location is selected from identified data storage locations. Based on the selection of the one data storage location, at least a portion of the source data is extracted and sent to the data storage location for storage. The extracted data is rewired to bind the extracted data at the data storage location to the template such that access of the application generated using the template provides access to the extracted data at the data storage location.

20 Claims, 9 Drawing Sheets

(56) References Cited

U.S. PATENT DOCUMENTS

| | | | |
|---|---|---|---|
| 8,245,183 B2* | 8/2012 | Iborra | G06F 8/30 |
| | | | 717/104 |
| 8,261,231 B1 | 9/2012 | Hirsch et al. | |
| 8,302,072 B2* | 10/2012 | Chandhoke | G06F 8/34 |
| | | | 715/763 |
| 8,484,612 B2* | 7/2013 | DelloStritto | H04L 67/10 |
| | | | 717/106 |
| 8,542,411 B2* | 9/2013 | Sisco | H04N 1/32133 |
| | | | 235/494 |
| 8,560,941 B2* | 10/2013 | Burns | G06F 8/38 |
| | | | 707/E17.005 |
| 8,683,318 B1* | 3/2014 | Dasari | G06F 8/30 |
| | | | 715/234 |
| 8,689,137 B2* | 4/2014 | McCormack | G06F 3/0481 |
| | | | 715/810 |
| 8,751,925 B1* | 6/2014 | Zhang | G06F 17/227 |
| | | | 715/234 |
| 8,954,841 B2* | 2/2015 | Jiang | G06F 8/51 |
| | | | 715/221 |
| 9,026,897 B2* | 5/2015 | Zarras | G06F 17/246 |
| | | | 715/219 |
| 9,286,032 B2* | 3/2016 | Feblowitz | G06F 8/20 |
| 9,348,561 B2* | 5/2016 | Sos-Munoz | G06F 8/00 |
| 9,459,846 B2* | 10/2016 | Bornheimer | G06F 8/38 |
| 2003/0056177 A1* | 3/2003 | Nara | G06F 17/212 |
| | | | 715/255 |
| 2004/0046789 A1* | 3/2004 | Inanoria | G06F 8/38 |
| | | | 715/748 |
| 2006/0150149 A1* | 7/2006 | Chandhoke | G06F 8/34 |
| | | | 717/109 |
| 2007/0061740 A1* | 3/2007 | Marini | G06F 8/38 |
| | | | 715/762 |
| 2007/0282616 A1 | 12/2007 | Brunswig et al. | |
| 2008/0005182 A1* | 1/2008 | Gauthier | G06F 17/2247 |
| 2009/0125254 A1* | 5/2009 | Kotter | G06F 17/5036 |
| | | | 702/57 |
| 2009/0125796 A1* | 5/2009 | Day | G06F 9/4443 |
| | | | 715/219 |
| 2009/0327328 A1* | 12/2009 | Woodall | G06F 17/218 |
| 2010/0077325 A1* | 3/2010 | Barnea | G06F 9/4443 |
| | | | 715/763 |
| 2010/0162142 A1* | 6/2010 | Cooper | G06F 8/38 |
| | | | 715/762 |
| 2010/0211862 A1* | 8/2010 | Parish | G06F 17/246 |
| | | | 715/212 |
| 2010/0262902 A1* | 10/2010 | Burns | G06F 8/38 |
| | | | 715/234 |
| 2010/0332401 A1 | 12/2010 | Prahlad et al. | |
| 2011/0055744 A1* | 3/2011 | Ryan | G06F 8/10 |
| | | | 715/769 |
| 2011/0066931 A1* | 3/2011 | Kim | G06F 9/4443 |
| | | | 715/205 |
| 2011/0270721 A1 | 11/2011 | Kusterer | |
| 2012/0233547 A1 | 9/2012 | McLachlan | |
| 2012/0278701 A1* | 11/2012 | Bockus | G06F 17/218 |
| | | | 715/235 |
| 2013/0212129 A1 | 8/2013 | Lawson et al. | |
| 2013/0262626 A1* | 10/2013 | Bozek | H04L 67/10 |
| | | | 709/217 |
| 2014/0026041 A1* | 1/2014 | Bhargav | G06F 17/211 |
| | | | 715/255 |
| 2014/0032640 A1* | 1/2014 | Dooley | G06F 9/4411 |
| | | | 709/203 |
| 2014/0047413 A1 | 2/2014 | Sheive et al. | |
| 2014/0053126 A1 | 2/2014 | Watson et al. | |
| 2014/0108971 A1* | 4/2014 | No | G06F 3/0482 |
| | | | 715/762 |
| 2014/0109037 A1* | 4/2014 | Ouali | G06F 8/10 |
| | | | 717/105 |
| 2014/0380139 A1* | 12/2014 | Mondri | G06F 17/246 |
| | | | 715/212 |
| 2015/0074546 A1* | 3/2015 | Slawson | G06F 3/0484 |
| | | | 715/747 |
| 2015/0134707 A1* | 5/2015 | Doherty | G06F 8/34 |
| | | | 707/806 |
| 2015/0135163 A1 | 5/2015 | Mun et al. | |
| 2015/0142949 A1 | 5/2015 | Nair | |
| 2015/0317289 A1* | 11/2015 | Jones | G06F 17/24 |
| | | | 715/234 |
| 2016/0055128 A1* | 2/2016 | Bhargav | G06F 17/211 |
| | | | 715/273 |
| 2016/0188302 A1* | 6/2016 | Fredrick | G06F 8/34 |
| | | | 717/107 |

OTHER PUBLICATIONS

AppSheet—How It Works—2016 https://www.appsheet.com/HowItWorks.*

"Make an App with AppSheet: Mar. 13, 2016 webinar | AppSheet" YouTube. YouTube, Apr. 1, 2016. https://www.youtube.com/watch?v=37dxlY0t3ml&list=PLZ81nepkT97Jie3V-A0yK7wus8s-VNyhj&index=9.*

Build a Mobile App with Google Forms and AppSheet by AppSheet; Published on Apr. 10, 2015: http://www.slideshare.net/AppSheet/build-a-mobile-app-with-google-forms-and-appsheet.*

Ibach, Susan, "Step by Step Apps for non coders—Windows Phone App Studio", Published on: Mar. 6, 2014, 16 pages. Available at: http://blogs.msdn.com/b/cdnstudents/archive/2014/03/06/step-by-step-apps-for-non-coders-windows-phone-app-studio.aspx.

"The Snappii Platform: User Guide", Published on: Sep. 2015, 137 pages. Available at: https://www.snappii.com/docs/Manual.pdf.

"Anypresence: Built for Enterprises", Published on: Jul. 29, 2014, 16 pages. Available at: http://www.anypresence.com/features/.

"Appery.io: Accelerate Mobile Innovation in the Enterprise", Retrieved on: Aug. 28, 2015, 4 pages. Available at: https://appery.io/appbuilder/.

Kaiser, et al., "SAP Insider", In Journal of SAPinsider, vol. 16, Issue 2, Apr. 2, 2015, 10 pages.

"Cozy a Personal Cloud", Retrieved on: Aug. 28, 2015, 10 pages. Available at: https://cozy.io/en/.

"IBM Bluemix", Retrieved on: Aug. 28, 2015, 2 pages. Available at: https://www.ng.bluemix.net/docs/.

"International Search Report and Written Opinion Issued in PCT Application No. PCT/US2016/060211", dated Jan. 23, 2017, 11 Pages.

"Second Written Opinion Issued in PCT Application No. PCT/US2016/060211", dated Sep. 1, 2017, 8 Pages.

* cited by examiner

GENERATION OF AN APPLICATION FROM TEMPLATE

BACKGROUND

Creating an executable computer program generally involves generating algorithms, verifying the correctness of the algorithms, and implementing the algorithms into a programming language. This process often requires expertise in many areas, including coding in the target programming language. For example, in an Integrated Developer Environment such as MICROSOFT VISUAL STUDIO, a designer exists to create a user interface form for an application. To assign a storage location for the application (e.g., to assign a location where application data is stored for access by an application user, or to assign a type of access for application data at a storage location), the developer typically adds code to provide application data access at runtime. Despite the fact that designers have existed in these tools for many years, and despite numerous productivity gains of Integrated Developer Environments, the process of adding code to provide application data access at runtime still often requires developer skills in writing the code that affects the application data access at runtime. In addition, developers typically have limited control over storage locations for an application, with the storage location frequently dictated by the developer environment.

Cloud storage provides an architecture for data storage that provides storage locations in logical pools, with the physical storage location often spanning multiple servers and/or multiple physical locations. Cloud storage includes public storage, private storage, and hybrid public/private storage options. Many cloud storage service providers allow users to control access to a portion of their cloud storage, such as through user credentials and user-configured permissions.

SUMMARY

Examples of the disclosure provide a system and method for automatically generating an application using a template. Applications are generated automatically using templates and source data received within the developer environment, such as on the design surface. Control over the where application data is stored and how it may be accessed is provided to a designer, such that the designer may dictate where the application data will live, who may access the application data, and what type of access an application user may have to the stored data. Application data access represents runtime behavior of the application. The access, representing runtime behavior of the application to provide access to application data at the storage location, may be generated without having to write code. Because the application is generated automatically, including the data storage and access selected by the designer, they are likely to involve less error at generation and at runtime. In addition, because the application is generated automatically, including binding the stored data at the storage location to the application generated using the template, the application may also be optimized for runtime efficiency. Further, because the application is automatically generated, application behaviors such as application data storage and access may be generated with less intrinsic knowledge of the system, and of coding in general.

Aspects of the disclosure provide a developer environment that any user, regardless of development experience or lack thereof, may utilize to create applications. General workplace computing skills, similar to skills employed when using MICROSOFT OFFICE or similar programs, are translated into a development environment. Because the applications are generated automatically from templates and source data, they further increase efficiency of a developer or user in development of an application. In addition, the development environment is translated to a non-developer user in such a way as to provide application development for any user, increasing the speed of application development for the user.

For example, a template is received at a design surface, the template including a data schema. A set of data for the template is received, and the set of data is bound to the template based on the data schema. Based on the set of data, at least a portion of the set of data is identified for extraction. A location for the identified portion of the set of data is received and the identified portion is extracted and stored at the received location. The extracted data stored at the received location is bound to the template, such that access to the application generated from the template provides access to the extracted data at the storage location. Because the selected template, the source data, and the location are received via user interaction with a design surface, without having to write code, the developer environment provides increased user interface functionality, in addition to bringing developer capabilities to a non-developer for generating applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, examples of the disclosure enable the creation of an application from a template. Generating an application using code generally requires a knowledge of programming, data capabilities and compatibilities, and so forth. Aspects of the disclosure provide for automatic generation of an application using a template, source data, and designer-selected data storage locations. Because the application is automatically generated from a template, there is reduced error rate at runtime of the application as there is less room for developer error because the code is auto-generated by the developer environment.

Aspects of the disclosure further enable increased user interaction performance and user efficiency via user interface interaction because user intent is inferred by the developer environment based on user interaction with visual elements of the design surface. This also contributes to reduced error rate in application development, which leads to reduced error rate at runtime as well.

Additionally, the examples described herein enable applications to be generated and/or modified in an efficient and effective manner with controlled data storage for increased performance. By generating and/or modifying an application as described in this disclosure, some examples reduce processing load and/or increase processing speed by strategically managing computational, processing, memory, and/or other resources. The effect of identifying and extracting portions of data from an automatically generated application for storage at one or more identified locations, and binding the extracted data at the identified locations to the generated application, improves performance of the application as well as the device hosting the application. Additionally, some examples may conserve memory, reduce network bandwidth usage, improve operating system resource allocation, and/or improve communication between computing devices by streamlining at least some operations, such as data storage and data access, by automating at least some operations.

Figure 1:
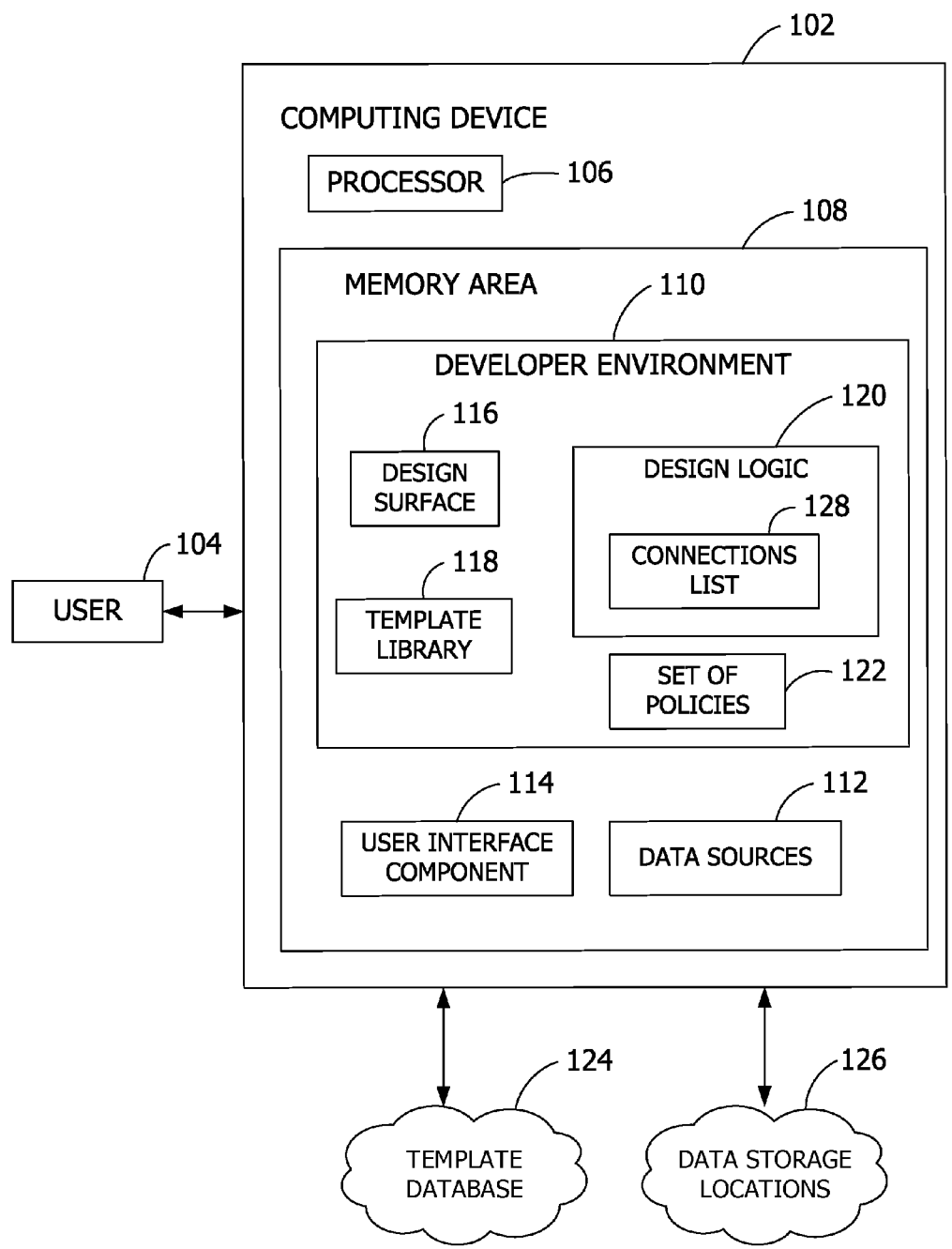
FIG. 1 is an exemplary block diagram illustrating a computing device for generating an application.

Referring again to FIG. 1, an exemplary block diagram illustrates a computing device for generating an application. In the example of FIG. 1, the computing device 102 associated with a user 104 represents a system for application design. The computing device represents any device executing instructions (e.g., as application programs, operating system functionality, or both) to implement the operations and functionality as described herein. The computing device may include a mobile computing device or any other portable device. In some examples, the mobile computing device includes a mobile telephone, laptop, tablet, computing pad, netbook, gaming device, and/or portable media player. The computing device may also include less portable devices such as desktop personal computers, kiosks, tabletop devices, industrial control devices, wireless charging stations, and electric automobile charging stations. Additionally, the computing device may represent a group of processing units or other computing devices.

In some examples, the computing device has at least one processor 106, a memory area 108, and at least one user interface. The processor includes any quantity of processing units, and is programmed to execute computer-executable instructions for implementing aspects of the disclosure. The instructions may be performed by the processor or by multiple processors within the computing device, or performed by a processor external to the computing device. In some examples, the processor is programmed to execute instructions such as those illustrated in the figures (e.g., FIG. 4 and FIG. 5).

In some examples, the processor represents an implementation of analog techniques to perform the operations described herein. For example, the operations may be performed by an analog computing device and/or a digital computing device.

The computing device further has one or more computer readable media such as the memory area. The memory area includes any quantity of media associated with or accessible by the computing device. The memory area may be internal to the computing device (as shown in FIG. 1), external to the computing device (not shown), or both (not shown). In some examples, the memory area includes read-only memory and/or memory wired into an analog computing device.

The memory area stores, among other data, one or more applications. The applications, when executed by the processor, operate to perform functionality on the computing device. Exemplary applications include developer environment 110, which may represent an application for designing other executable applications. The applications may communicate with counterpart applications or services such as web services accessible via a network (not shown). For example, the applications may represent downloaded client-side applications that correspond to server-side services executing in a cloud. In some examples, applications generated may be configured to communicate with data sources and other computing resources in a cloud during runtime, or may share and/or aggregate data between client-side services and cloud services. The memory area may store data sources 112, which may represent data stored locally at memory area 108, data access points stored locally at memory area 108 and associated with data stored remote from computing device 102, or any combination of local and remote data.

The memory area further stores one or more computer-executable components. Exemplary components include a user interface component. The user interface component 114, when executed by the processor 106 of computing device 102, cause the processor 106 to perform operations, including to receive user selections during user interaction with developer environment 110, for example.

In some examples, the user interface component includes a graphics card for displaying data to the user and receiving data from the user. The user interface component may also include computer-executable instructions (e.g., a driver) for operating the graphics card. Further, the user interface component may include a display (e.g., a touch screen display or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way. In another example, the user may input commands or manipulate data by providing a gesture detectable by the user interface component, such as a touch or tap of a touch screen display or natural user interface.

Developer environment 110 provides design tools and a design environment for application design and generation. In some examples, developer environment 110 includes design surface 116, template library 118, design logic 120, and set of policies 122. Design surface 116 may be an interactive canvas or interactive design surface of developer environment 110. In some examples, design surface 116 is part of an interactive graphical user interface displayed on an interactive computing device. For example, design surface 116 may be an interactive surface communicatively coupled to a gesture detection mechanism, such as gesture detection component of a touchscreen, such that gestures detected are used to communicate interaction with the developer environment, or elements of the developer environment.

Template library 118 may include one or more application templates, which may be selected or used in application design. In some examples, template library 118 may have representations of application templates that may be selected from template database 124 and customized via user interaction with design surface 116. In this example, template database 124 may be located at a location remote from computing device 102 and accessible by developer environment 110, such as in a cloud storage location. In other examples, template database 124 may be located at memory area 108. Template library 118 periodically synchronizes with template database 124 to receive updated metadata associated with templates from the template database.

Example templates may include application templates for, without limitation, asset management applications, catalog applications, contract applications, customer relationship management (CRM) applications, dashboard and report applications, events and calendars applications, timesheet applications, expense tracking and/or reporting applications, media applications, multi-media applications, personal management applications, travel applications, project management applications, and so on. In general, the example templates may be template categories, with a number of application templates for each category. In some examples, each category may have multiple layers of sub-categories. As one example, template library 118 includes an asset management application template category, with application templates for site inspector applications, image-tagging applications, and other applications pertaining to asset management. The template library may provide another layer of templates under site inspector applications, providing various different site inspector application templates as well. In some examples, the different application templates may provide different visual layout options or different data exposure components. A template includes a document and a schema, the document providing the visual layout and components along with sample data populated according to the schema. When a template is selected, and source data is received, the source data is wired to the visual layout and components of the template according to the template schema.

Design logic 120 is a component of developer environment 110 that binds source data to a selected template, identifies data storage locations, extracts and stores application data based on user selections and/or a set of policies 122, and rewires, or re-binds, extracted data to the application generated using the template. Design logic 120 identifies data storage locations 126 and provides the identified data storage locations as connections list 128. Connections list 128 may be provided to design surface 116 for user interaction and selection of a designated data storage location for application data, or a portion of application data.

In one example, data storage locations 126 may be discovered by developer environment 110 based on user credentials associated with user 104. For example, user 104 may log-in to developer environment 110 with user credentials associated with a user profile accessible by developer environment 110. In this example, the user profile may store data storage locations and associated credentials that user 104 has previously used in interacting with developer environment 110. In other examples, developer environment 110 may detect a data storage location associated with user 104 based on user credentials, and prompt user 104 to provide access to the detected data storage location via design surface 116. In still other examples, developer environment 110 may be associated with an enterprise network, and one or more data storage locations corresponding to the enterprise network may be provided as some of the data storage locations available for selection in connections list 128. In another example, data storage locations 126 may be provided to developer environment 110 by a discovery service. In yet another example, data storage locations 126 may be provided to developer environment 110 by user 104, for example.

Design logic 120 identifies storage locations, identifies application data for extraction, and identifies storage locations for extracted data based in part on set of policies 122. Set of policies 122 may include, without limitation, rules and parameters associated with a file size, a distribution list, historical data storage locations associated with a user, historical data storage locations associated with a type of data, historical data storage locations associated with a data policy, capacity of a data storage location, a type of data, permissions, data sensitivity, data restrictions, target storage access restrictions, how the application is using the data, a type of data being captured by the application, or any other suitable parameter.

In addition to set of policies 122, design logic 120 may identify data for extraction and storage based on policies attached to the data, such as enterprise data for example. In some examples, where policies attached to the source data are identified, design logic 120 may enforce the attached policies over a user selection. In the example of enterprise data, a data storage location may be based on the enterprise data policy, or a distribution (e.g. who the application is shared with) of the generated application may be limited based on enterprise data associated with the application for example.

As another example, design logic 120 may use set of policies 122 to determine that an application generated from a selected template is used to update records corresponding to inventory. Because the inventory records are dynamic, design logic 120 may determine that the inventory data is to be stored at a shared location, such as a cloud storage location. Design logic 120 may identify static application data, such as inventory categories for example, and determine that the static data is to be stored locally with the template, such that the static data is stored locally at the generated application.

Figure 2:
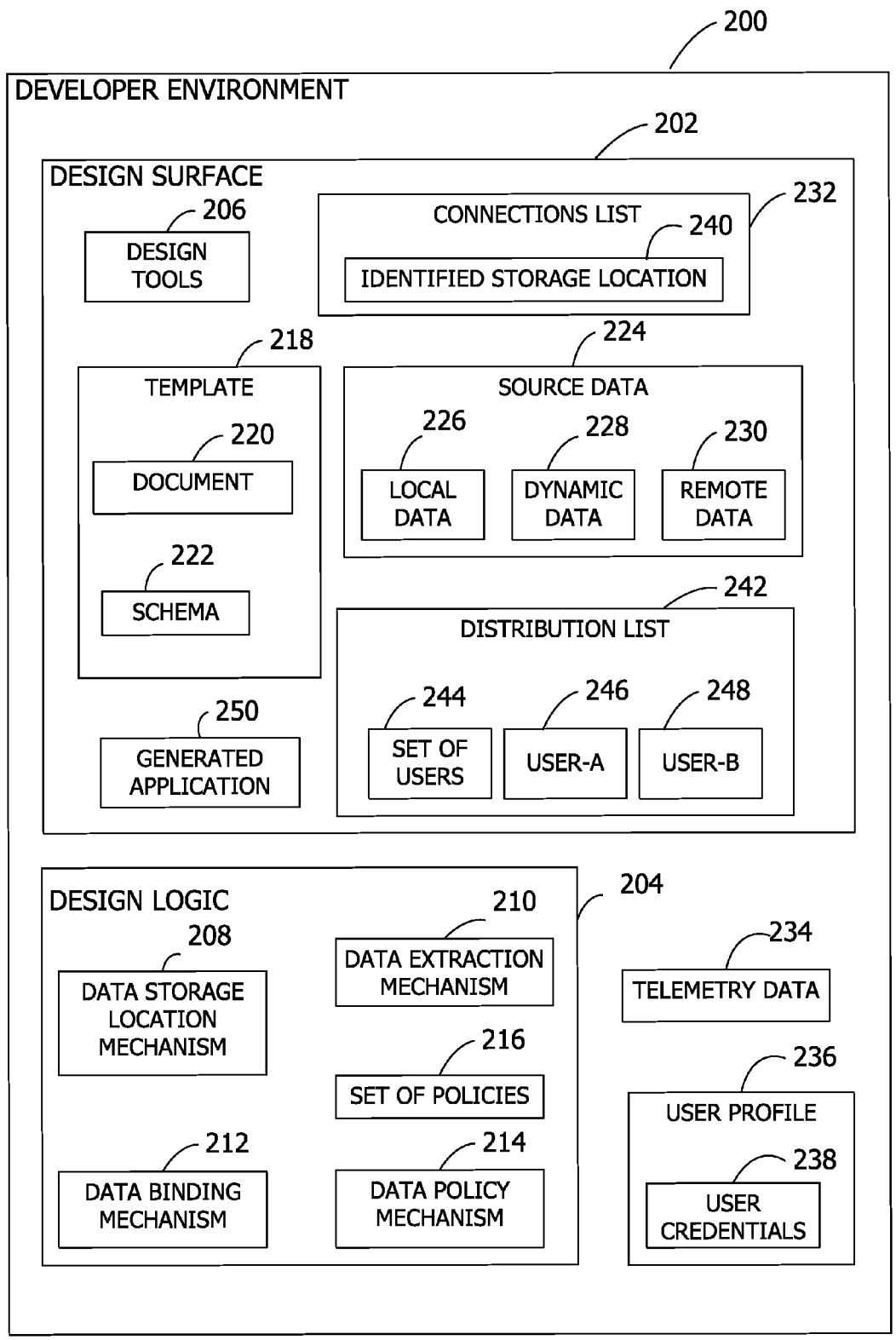
FIG. 2 is an exemplary block diagram illustrating a developer environment for generating an application.

FIG. 2 is an exemplary block diagram illustrating a developer environment for generating an application. Developer environment 200 is an illustrative example of one implementation of developer environment 110 in FIG. 1. Developer environment 200 includes design surface 202 and design logic 204.

Design surface 202 may be an interactive canvas for receiving templates, source data, and interactions with the templates and source data, which are used by design logic 204 to automatically generate an application. For example, design surface 202 may be a portion of developer environment 200 that is displayed via a user interface and is configured to receive user interaction. Design surface 202 may include design tools 206, which may be application resources of developer environment 200. For example, design tools 206 may include template library 118 of FIG. 1.

Design logic 204 may include a number of algorithms, rules, and parameters for automatically generating an application using a template and source data, identifying portions of the source data for extraction and storage at identified storage locations and binding the extracted data at the identified storage locations to the generated application, such that access to the application provides access to the stored data regardless of the location of the stored data. For example, design logic 204 may include, without limitation, data storage location mechanism 208, data extraction mechanism 210, data binding mechanism 212, data policy mechanism 214, and set of policies 216.

In an exemplary operation, design surface 202 may receive a template selection, as illustrated by template 218. Template 218 may be an application template having document 220 and schema 222. Document 220 includes visual components and visual layout for the application generated using template 218, as well as sample data applied to the template using schema 222. The sample data mapped based on schema 222 provides a visual representation of how source data may be applied to the visual layout and visual components of template 218, for application design. As one illustrative example, document 220 may provide a table and the sample data may be mapped to the table based on schema 222. In this example, the sample data may be formatted as spreadsheet data, with the spreadsheet data mapped to the table in the template based on schema 222 As another example, document 220 may provide a set of pages or set of screens of an application, and schema 222 may map sample data of images, with an individual sample image for an individual screen.

Design surface 202 also receives source data 224. Source data 224 is provided by a user, in some examples by opening a file or dragging a file onto design surface 202. Source data 224 may include one or more different source files, in these examples. For example, source data 224 may include one or more of user data, remote data, shared data, enterprise data, public data, dynamic data, local data, or any other accessible data.

In this example, data extraction mechanism 210 identifies data types for source data 224, including local data 226, dynamic data 228, and remote data 230. Local data 226 is static data, which may be maintained locally at the generated application. Dynamic data 228 is data that may have local origination but may change at runtime of the application. Dynamic data may be identified based on rules associated with the schema 222, such as data that is mapped to a read/write component of document 220 for example. Remote data is data that is already stored in a cloud storage location. Examples of remote data may include enterprise data or public data.

Data storage location mechanism 208 identifies data storage locations, such as data storage locations 126 in FIG. 1, and provides the identified locations as connections list 232 to design surface 202. Connections list 232 may be an interactive list of available storage locations. User selection of a storage location from connections list 232 triggers data extraction mechanism 210 to analyze source data 224 and identify at least a portion of source data 224 for extraction to send to the selected storage location. Data storage location mechanism may also use any of set of policies 216, telemetry data 234 and user profile 236 to determine the available storage locations, provide the connections list, and infer a default storage location to provide as a suggested location at the connections list.

Telemetry data 234 may include machine learning information derived from analysis of a distributed developer environment and previous applications generated using templates. For example, telemetry data 234 may include information on where data gets stored, what types of data get stored at what types of locations, what types of data get extracted, and so no. User profile 236 may include historical information corresponding to user interaction with developer environment 200, as well as other user information, such as user credentials 238. Historical information may include who a user has shared previously generated applications with, where a user has previously selected to store data or a portion of data, and other historical application design and development information associated with the user. In some examples, the user intent may be determined in part based on past user interactions with the developer environment or past user selections corresponding to the selected template, the received data, or both. The user intent may be inferred by data on past user selections or interactions via data collected through application analytics in association with the user profile. In other examples, the user intent may be determined based on telemetry, a data storage location match for the type of data received, the available data storage locations, and/or the other parameters, selections, and data used in the current application design.

Data extraction mechanism 210 uses set of policies 216 and identified storage location 240 to determine which portion of source data 224 to extract and where to store the extracted portion. In some examples, identified storage location 240 may be a default storage location identified by data storage location mechanism 208 and provided as a suggested storage location at connections list 232. Absent selection of a different storage location, the suggested storage location may become the identified storage location for storage of extracted application data. In other examples, identified storage location 240 may be a user selected storage location from a list of locations provided in connections list 232. Data extraction mechanism 210 may also access a service, such as a back-end service of a data storage location, and optionally provide credentials to the service in order to access and store the extracted data. In some examples, user credentials may be stored in a user profile or otherwise identified based on other user credentials identified by developer environment 200.

In an illustrative example, data extraction mechanism identifies local data 226 and dynamic data 228 of source data 224, and using set of policies 216 maintains local data 226 at document 220 while extracting dynamic data 228, sending the extracted dynamic data to the identified storage location 240. Data binding mechanism 212 rewires, or re-binds, dynamic data 228 located at identified storage location 240 to document 220. Application generation transforms document 220 into a published application and binds the source data to the application regardless of the storage location of the source data, or the storage location of portions of the source data. For example, if document 220 is shared as a published application with another user, that other user will have access to the storage location(s) where dynamic data and/or remote data is stored, via the application.

Data policy mechanism 214 enforces policies attached to source data 224, as well as set of policies 216. As an example, remote data 230 may include enterprise data, with associated enterprise policies. Distribution list 242 may be an interactive portion of design surface 202 that provides for selection of one or more recipients of the published application. Distribution list 242 may include recipients such as set of users 244, user-A 246 and user-B 248. In this example, set of users 244 may be a group of recipients with an enterprise network, while user-A 246 and user-B 248 are recipients outside the enterprise network. Data policy mechanism 214 may identify enterprise data policies associated with remote data 230, such as policies limiting access of enterprise data to in-network users for example. Data policy mechanism 214 may generate data access expressions for generated application 250, providing access of remote data 230 via generated application 250 to set of users 244 while restricting access to user-A 246 and user-B 248. In this same example, user-A 246 and user-B 248 may have access to dynamic data 228 and local data 226 of generated application 250, without having access to remote data 230.

Figure 3:
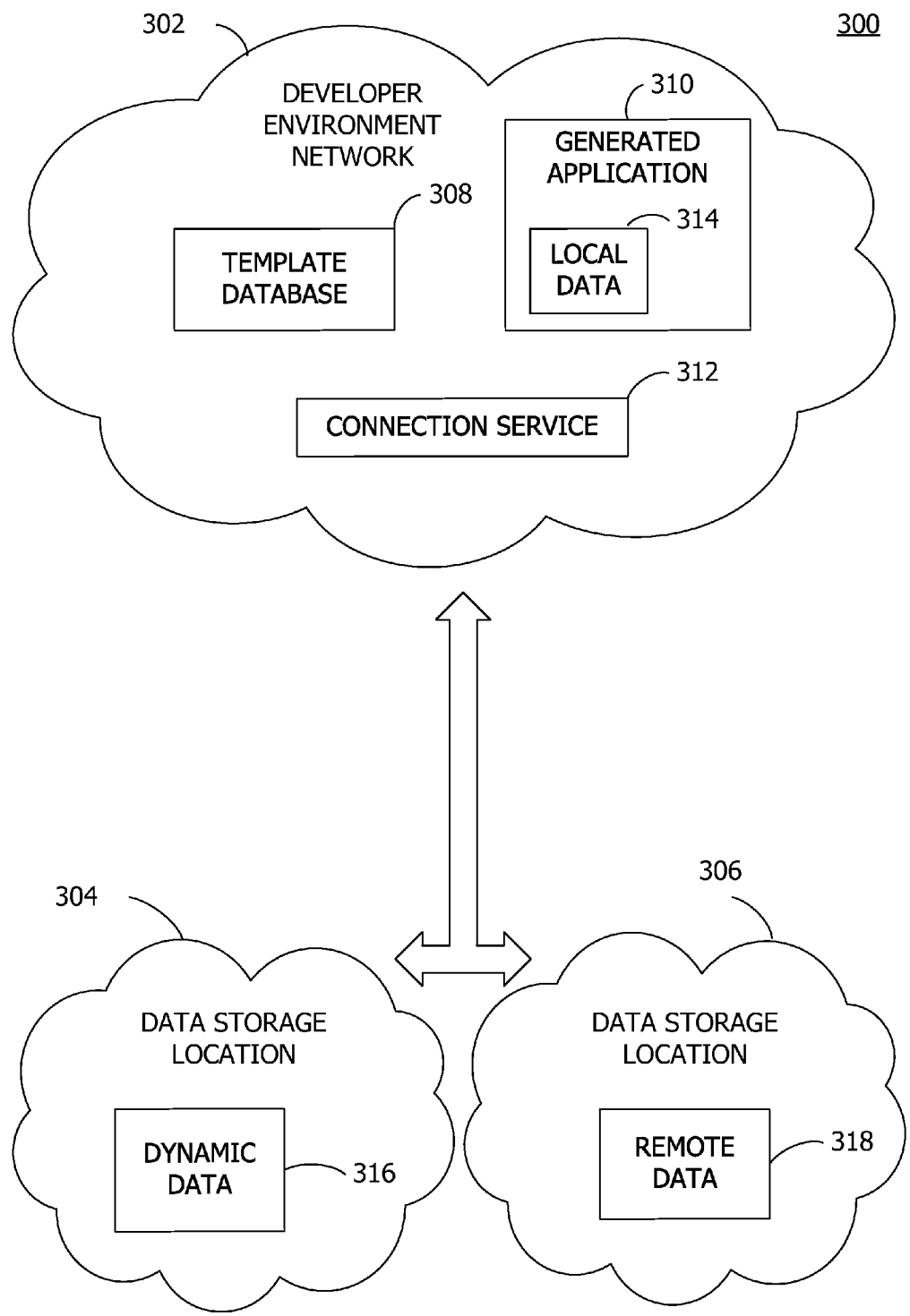
FIG. 3 is an exemplary diagram illustrating data storage for an application.

FIG. 3 is an exemplary diagram illustrating data storage for an application. Developer environment 300 may be an illustrative example of one implementation of developer environment 110 in FIG. 1 and/or developer environment 200 in FIG. 2.

Developer environment 300 includes developer environment network 302, data storage location 304 and data storage location 306. Developer environment network 302 may include cloud storage and one or more network devices for implementing components of the developer environment, for example. In this example, template database 308 is maintained at developer environment network 302, and is accessible to instances of the developer environment. For example, template library 118 in FIG. 1 may be populated from template database 308. Upon publication via user selection to create an application from a selected template and source data, an application is automatically generated and stored in developer environment network 302, represented by generated application 310. Generated application 310 may be accessible to any user the application is shared with, such as users selected from the distribution list 242 in FIG. 2, or may be published for public access in some examples.

Connection service 312 provides for communication between developer environment network 302 and data storage locations 304 and 306, having knowledge of protocols and other information needed to communicate with the back-end services associated with data storage locations.

As illustrated in FIG. 3, portions of source data 224 in FIG. 2 are stored in one or more locations as determined by design logic 204. In this example, generated application 310 is depicted with local data 314 stored at the generated application, dynamic data 316 stored at data storage location 304, and remote data 318 stored at data storage location 306.

Figure 4:
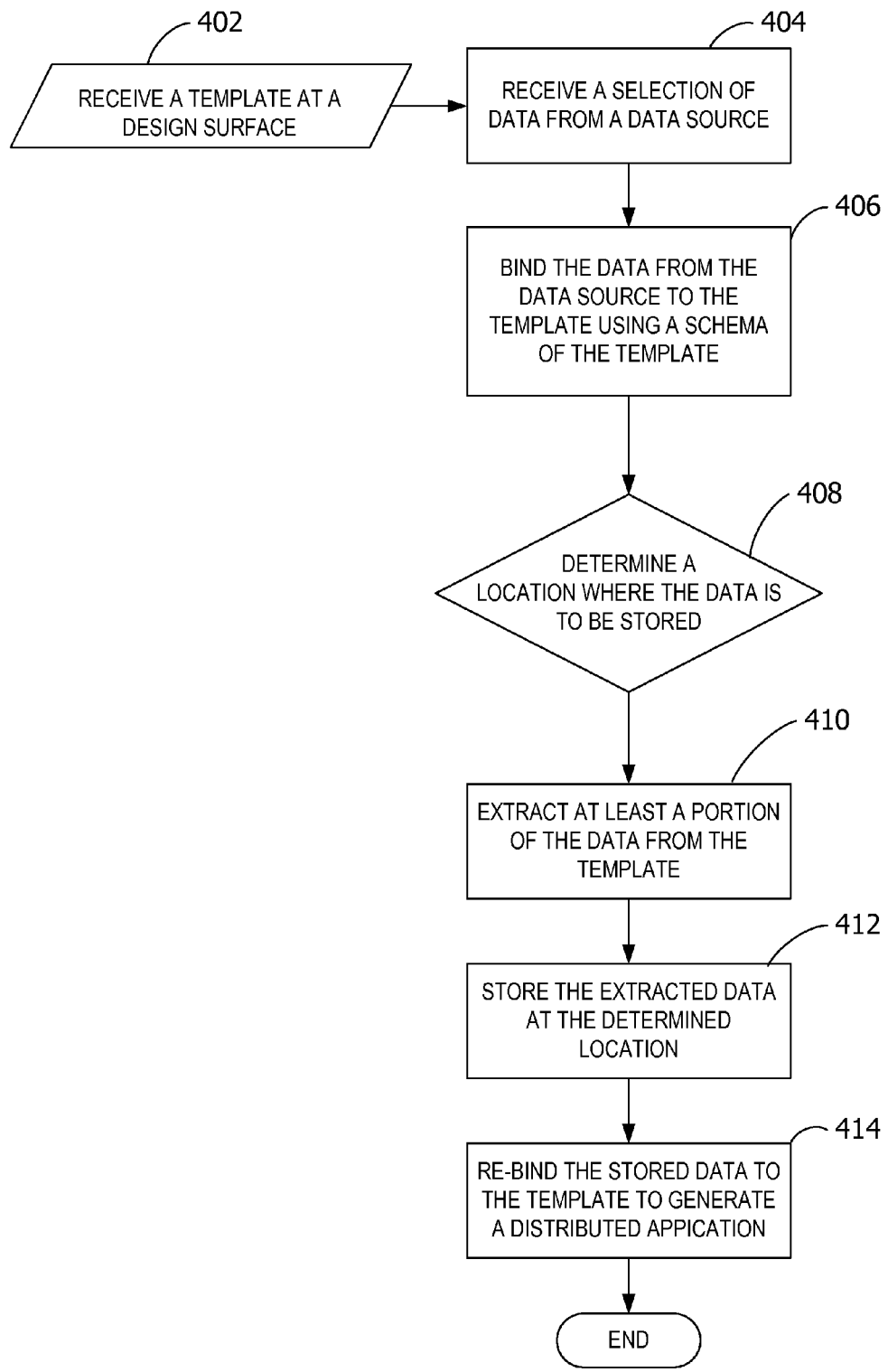
FIG. 4 is an exemplary flow chart illustrating operation of the computing device to extract and store application data.

FIG. 4 is an exemplary flow chart illustrating operation of the computing device to generate an application. The exemplary operations presented in FIG. 4 may be performed by one or more components described in FIG. 1 or FIG. 2, for example.

The process begins by receiving a template at a design surface at operation 402. The template is received by user selection from a template library, for example. The template may represent an application template for a type or category of application being designed.

The process receives a selection of data from a data source at operation 404. The selection of the data may be received from a user opening a file, or dragging a file onto the design surface, in some examples. The data may also be received from more than one data source, in some examples.

The process binds the data from the data source to the template using a schema of the template at operation 406. The schema may be a data schema that maps the received data to components of the selected template, for example. The process determines a location where the data is to be stored at operation 408. The location may be one or more data storage locations, determined based at least in part on a set of policies.

The process extracts at least a portion of the data from the template at operation 410. The portion may be the entire selection of data from the data source, or less than the entire selection of data from the data source. The process stores the extracted data at the determined location at operation 412. Additionally, more than one portion of the selected data may be extracted for storage at different locations, in some examples. The process re-binds the stored data to the template to generate a distributed application at operation 414, with the process terminating thereafter.

Figure 5:
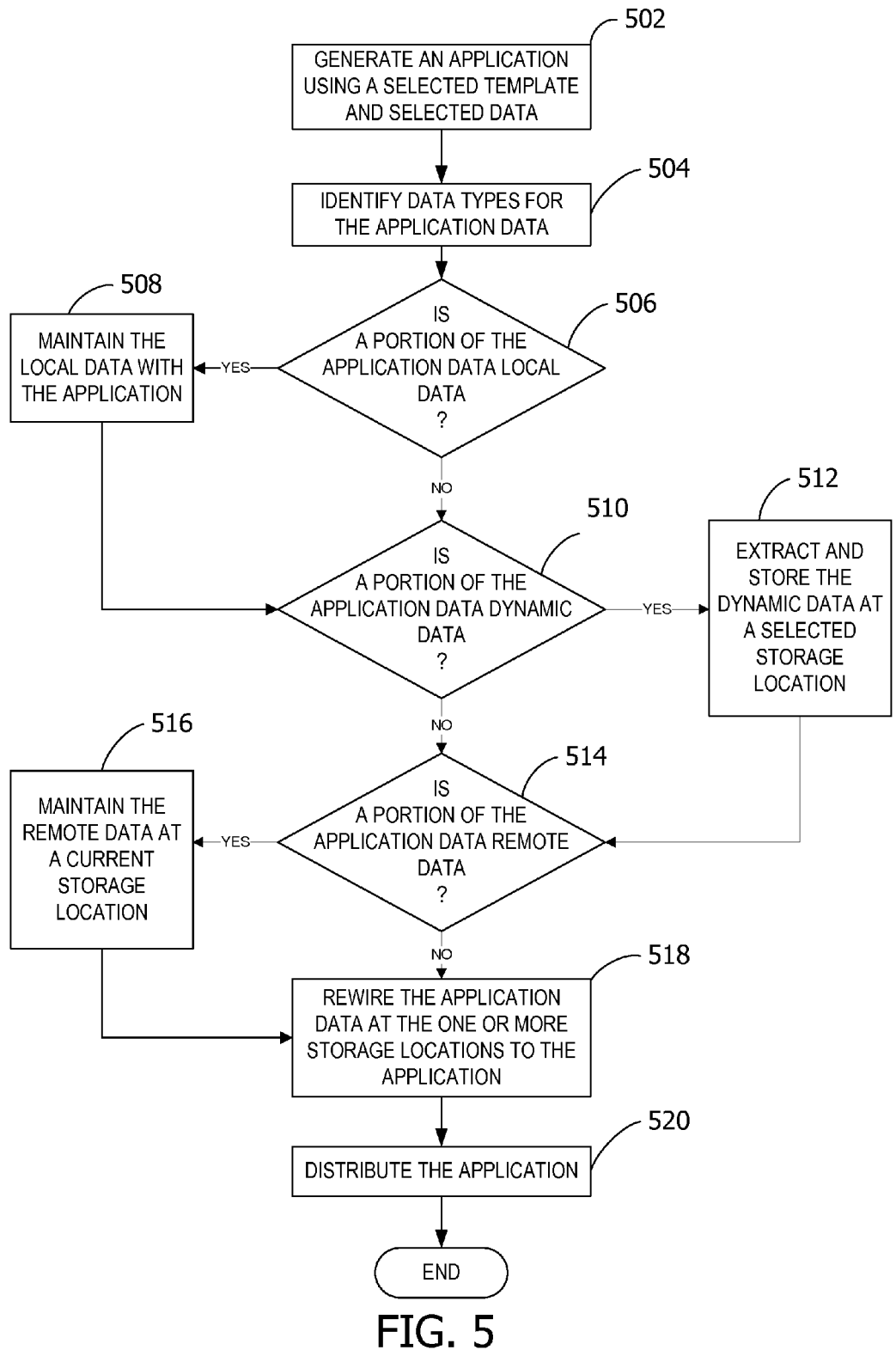
FIG. 5 is an exemplary flow chart illustrating operation of the computing device to identify storage locations for application data.

FIG. 5 is an exemplary flow chart illustrating operation of the computing device to identify storage locations for application data. The exemplary operations presented in FIG. 5 may be performed by one or more components described in FIG. 1 or FIG. 2, for example.

The process begins generating an application using a selected template and selected data at operation 502. The template and data may be received by a user selecting the template at a design canvas of the design surface, and selecting data from a data source, for example, through a gesture such as a tap to select the template from a template list displayed on the canvas for inclusion into the application design.

The process identifies data types for the application data of the generated application at operation 504. The data types may include, without limitation, local data, dynamic data, and remote data.

The process determines whether a portion of the application data is local data at operation 506. If the process determines that a portion of the application data is local data, the process maintains the local data with the application at operation 508. Maintaining local data with the application may refer to binding the data location of the local data to the application, for example. The process may then proceed to operation 510.

If the process determines that a portion of the application data is not local data at operation 506, the process may proceed to operation 510. The process determines whether a portion of the application data is dynamic data at operation 510. If the process determines that a portion of the application data is dynamic data, the process extracts and stores the dynamic data at a selected storage location at operation 512. The selected storage location may be an identified storage location received from a user selection, or a default storage location suggested by the developer environment, in some examples.

If the process determines that there is no dynamic data as part of the application data, the process determines whether a portion of the application data is remote data at operation 514. If a determination is made that a portion of the application data is remote data, the process maintains the remote data at a current storage location at operation 516. The process then rewires the application data at the one or more storage locations to the application at operation 518, and distributes the application at operation 520, with the process terminating thereafter.

Figure 6:
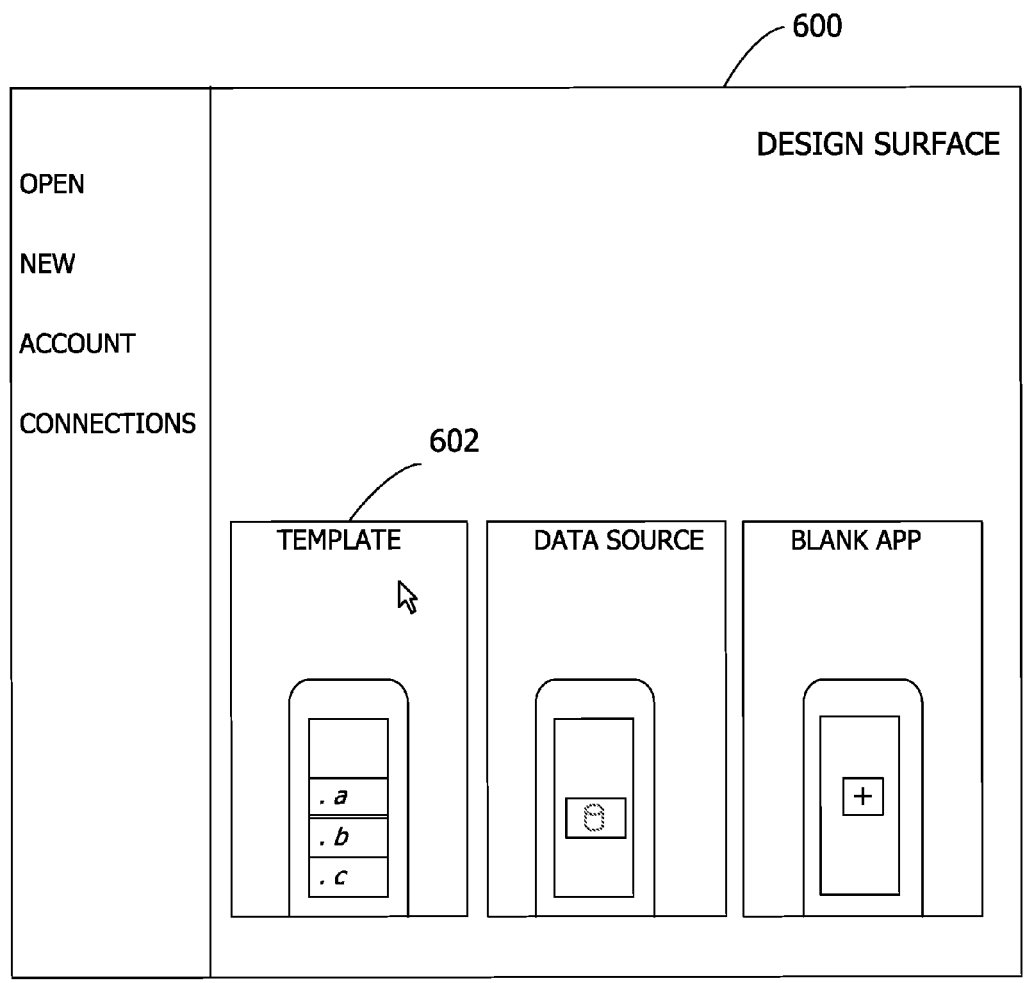
FIG. 6 is an exemplary diagram illustrating an interactive design surface.

FIG. 6 is an exemplary diagram illustrating an interactive design surface, such as design surface 202 in FIG. 2. Design surface 600 may be an illustrative example of a graphical user interface displaying a developer environment, for example.

Design surface 600 may include a template component 602, which may be a selectable component to enter a template mode of an application designer. Template component 602 may be one example of a design tool, such as design tools 206 in FIG. 2. Selection of template component 602 may provide an interactive list of templates from template library 118, for example.

Figure 7A:
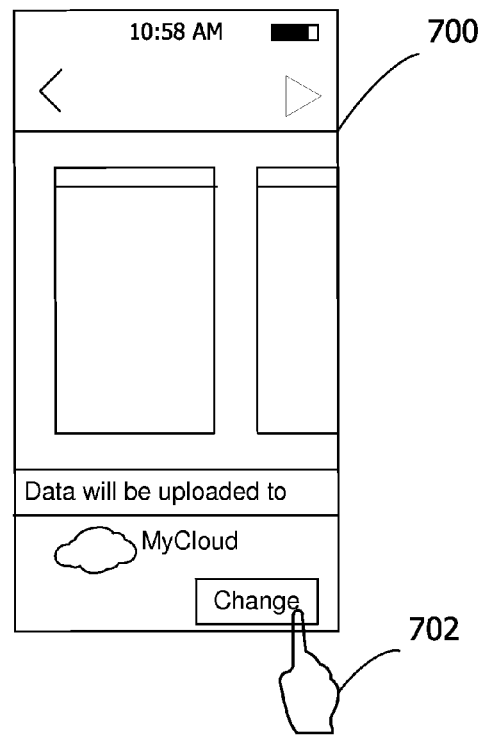
FIGS. 7A and 7B are exemplary diagrams illustrating an interactive design surface for data storage selection.
Figure 7B:
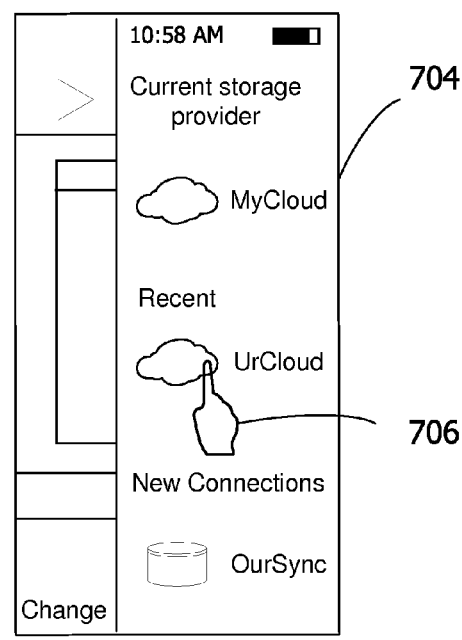

FIG. 7A and FIG. 7B depict an exemplary diagram illustrating user selection of data storage locations for an application. Design surface 700 illustrates a design surface displaying a default data storage location for application data. Designer intent or user intent is factored into the storage location mechanism to achieve a suggested storage location in this illustrative example. User selection 702 may be a user selection to change a data storage location from a default location, or assign a new data storage location.

Design surface 704 illustrates a design surface displaying a connection list, such as connections list 232 in FIG. 2. A current storage provider, or a default or suggested storage provider may be indicated, as well as recent connections (e.g. based on past user interactions or user credentials) and new connections (e.g. based on discovery of other available data storage locations). User selection 706 may be a user selection to control the storage of application data to a selected location.

Additional Examples

In some examples, based on login credentials of a user, the design logic may know or may infer possible data locations for storage of application data. For example, based on login credentials associated with a shared storage location in the cloud, design logic may infer the shared storage location as a default storage location for dynamic data identified in the application data.

In other examples, an application template may include individual logic for applying data to the template schema, as well as policies for the template that may be enforced by the data policy mechanism. These template policies and/or logic may also be used by the data extraction mechanism to determine what portion of the application data to extract, and where extracted portions of data are to be stored. For example, the data extraction mechanism may infer that a table having associated rules for updating, augmenting, or otherwise manipulating data is to be extracted and pushed to a shared location when the application is published, such that users of the application have access to the dynamic data of the table at the shared location.

User intent for data storage may also be inferred based on telemetry or machine learning. In an example scenario, a default storage location for a user may be based upon machine learning from past user behavior, or based on telemetry for a new user. Additionally, repeated gestures of a same type, such as repeated taps on an interactive connections list, may be interpreted as an indication that user intent is for a different selection, such as to rotate through location options, for example.

In addition, extracted data does not have to be stored at the same location, subsets of extracted data may be stored at different locations. A user may select to store some data in one location and other data at another location, for example. In some examples, the data extraction mechanism may determine to store data at multiple locations based on the set of policies, such as due to storage capacity or data types, for example. In still other examples, the data extraction mechanism may decide not to extract data or portions of data based on the set of policies, but rather to keep certain portions of data local, such as due to bandwidth restrictions for example.

Alternatively or in addition to the other examples described herein, examples include any combination of the following:

identifying one or more data types of the set of data, the one or more data types including at least one of local data, dynamic data, or remote data;

wherein the portion of the set of data for extraction is identified based at least in part on a set of policies;

wherein the portion of the set of data for extraction is identified based at least in part on telemetry data;

receiving a first location for a first subset of the portion of the set of data;

receiving a second location for a second subset of the portion of the set of data;

storing the first subset at the first location and the second subset at the second location;

identifying one or more locations for data storage;

providing the one or more locations as a connections list;

receiving the selection of the location from the one or more locations of the connections list;

identifying a default location from the one or more locations, the default location identified based at least in part on a set of policies;

providing the default location as a suggested location in the connections list;

wherein the data storage location mechanism provides a connections list to the design surface;

wherein the data storage location mechanism identifies a default storage location from the one or more identified data storage locations and provides the default storage location as a suggested storage location in the connections list;

wherein the design surface is coupled to a template library, the template library having a number of templates, an individual template of the number of templates comprising a document and a schema;

wherein the source data comprises at least one of local data, dynamic data, and remote data;

wherein the data extraction mechanism identifies the local data and maintains storage of the local data at the template;

wherein the data extraction mechanism identifies the remote data as a subset of the source data that is stored at a remote location and maintains the storage of the remote data at the remote location;

wherein the data extraction mechanism identifies the dynamic data as a subset of the source data that is to be stored at another data storage location, and extracts the dynamic data to send to the other data storage location;

wherein the data extraction mechanism identifies one or more data types of the source data, the one or more data types including at least one of local data, dynamic data, or remote data;

wherein the portion of the source data for extraction is identified based at least in part on the set of policies;

wherein the data storage location mechanism provides the one or more identified storage locations as a connections list to the design surface;

wherein the design surface receives the at least one identified location for storage of the extracted portion of the source data as a user selection from the connections list.

In some examples, the operations illustrated in FIG. 4 and FIG. 5 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Figure 8:
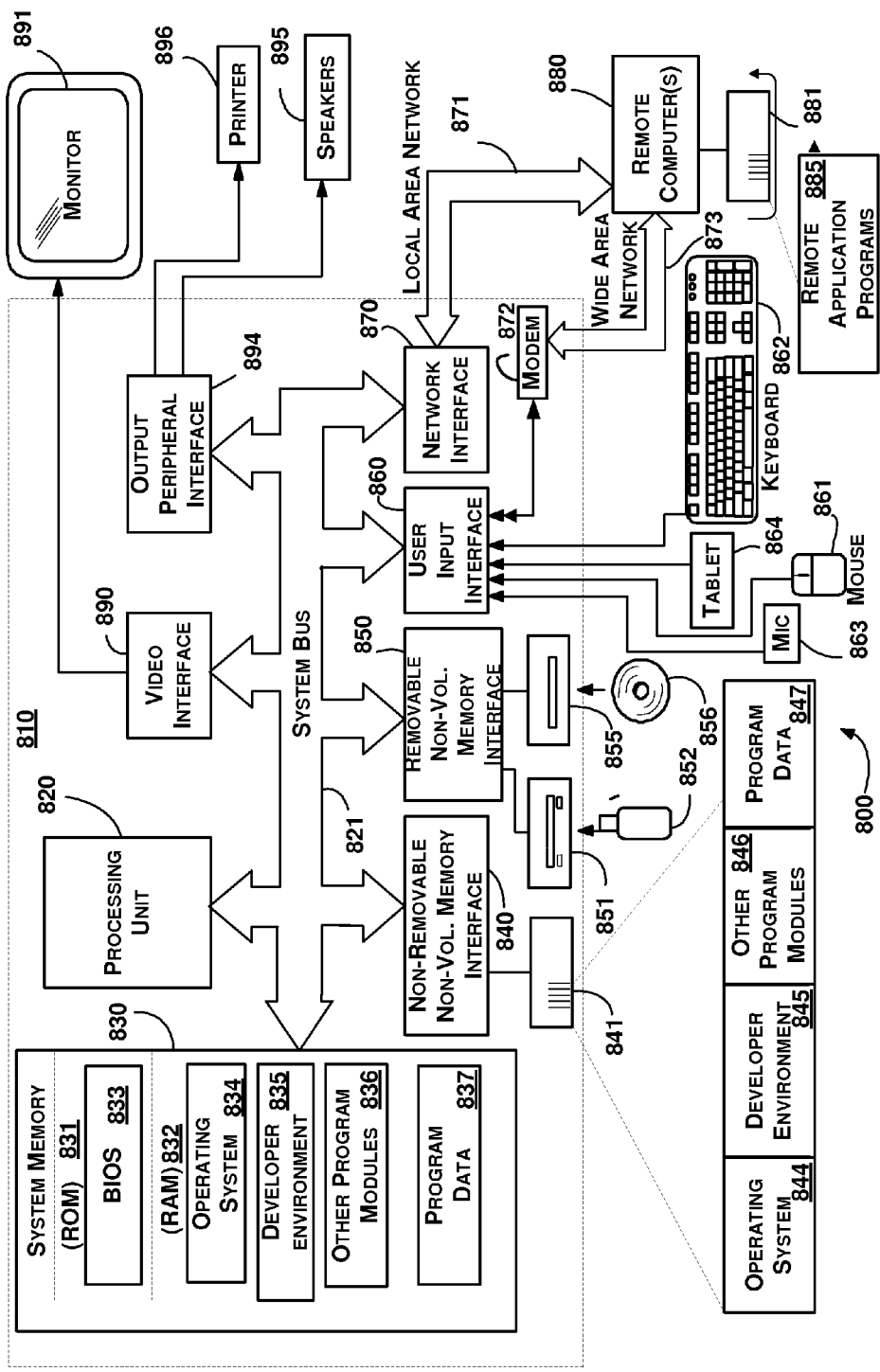
FIG. 8 is an exemplary block diagram illustrating an operating environment for a computing device implementing developer environment.

FIG. 8 illustrates an example of a suitable computing and networking environment 800 on which the examples of FIG. 1 may be implemented. The computing system environment 800 is only one example of a suitable computing environment and is not intended to suggest any limitation as to the scope of use or functionality of the disclosure. Neither should the computing environment 800 be interpreted as having any dependency or requirement relating to any one or combination of components illustrated in the exemplary operating environment 800.

The disclosure is operational with numerous other general purpose or special purpose computing system environments or configurations. Examples of well-known computing systems, environments, and/or configurations that may be suitable for use with the disclosure include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and so forth, which perform particular tasks or implement particular abstract data types. The disclosure may also be practiced in distributed computing environments where tasks are performed by remote processing devices that are linked through a communications network. In a distributed computing environment, program modules may be located in local and/or remote computer storage media including memory storage devices and/or computer storage devices. As used herein, computer storage devices refer to hardware devices.

With reference to FIG. 8, an exemplary system for implementing various aspects of the disclosure may include a general purpose computing device in the form of a computer 810. Components of the computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 810 typically includes a variety of computer-readable media. Computer-readable media may be any available media that may be accessed by the computer 810 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Memory 831 and 832 are examples of computer storage media. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may accessed by the computer 810. Computer storage media does not, however, include propagated signals. Rather, computer storage media excludes propagated signals. Any such computer storage media may be part of computer 810.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs, such as developer environment 835, other program modules 836 and program data 837.

The computer 810 may also include other removable/non-removable, volatile/nonvolatile computer storage media. By way of example only, FIG. 8 illustrates a hard disk drive 841 that reads from or writes to non-removable, nonvolatile magnetic media, a universal serial bus (USB) port 851 that provides for reads from or writes to a removable, nonvolatile memory 852, and an optical disk drive 855 that reads from or writes to a removable, nonvolatile optical disk 856 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and USB port 851 and optical disk drive 855 are typically connected to the system bus 821 by a removable memory interface, such as interface 850.

The drives and their associated computer storage media, described above and illustrated in FIG. 8, provide storage of computer-readable instructions, data structures, program modules and other data for the computer 810. In FIG. 8, for example, hard disk drive 841 is illustrated as storing operating system 844, developer environment 845, other program modules 846 and program data 847. Note that these components may either be the same as or different from operating system 834, developer environment 835, other program modules 836, and program data 837. Operating system 844, developer environment 845, other program modules 846, and program data 847 are given different numbers herein to illustrate that, at a minimum, they are different copies. A user may enter commands and information into the computer 810 through input devices such as a tablet, or electronic digitizer, 864, a microphone 863, a keyboard 862 and pointing device 861, commonly referred to as mouse, trackball or touch pad. Other input devices not shown in FIG. 8 may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. The monitor 891 may also be integrated with a touch-screen panel or the like. Note that the monitor and/or touch screen panel may be physically coupled to a housing in which the computing device 810 is incorporated, such as in a tablet-type personal computer. In addition, computers such as the computing device 810 may also include other peripheral output devices such as speakers 895 and printer 896, which may be connected through an output peripheral interface 894 or the like.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 8. The logical connections depicted in FIG. 8 include one or more local area networks (LAN) 871 and one or more wide area networks (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860 or other appropriate mechanism. A wireless networking component such as comprising an interface and antenna may be coupled through a suitable device such as an access point or peer computer to a WAN or LAN. In a networked environment, program modules depicted relative to the computer 810, or portions thereof, may be stored in the remote memory storage device. By way of example, and not limitation, FIG. 8 illustrates remote application programs 885 as residing on memory device 881. It may be appreciated that the network connections shown are exemplary and other means of establishing a communications link between the computers may be used.

Figure 9:
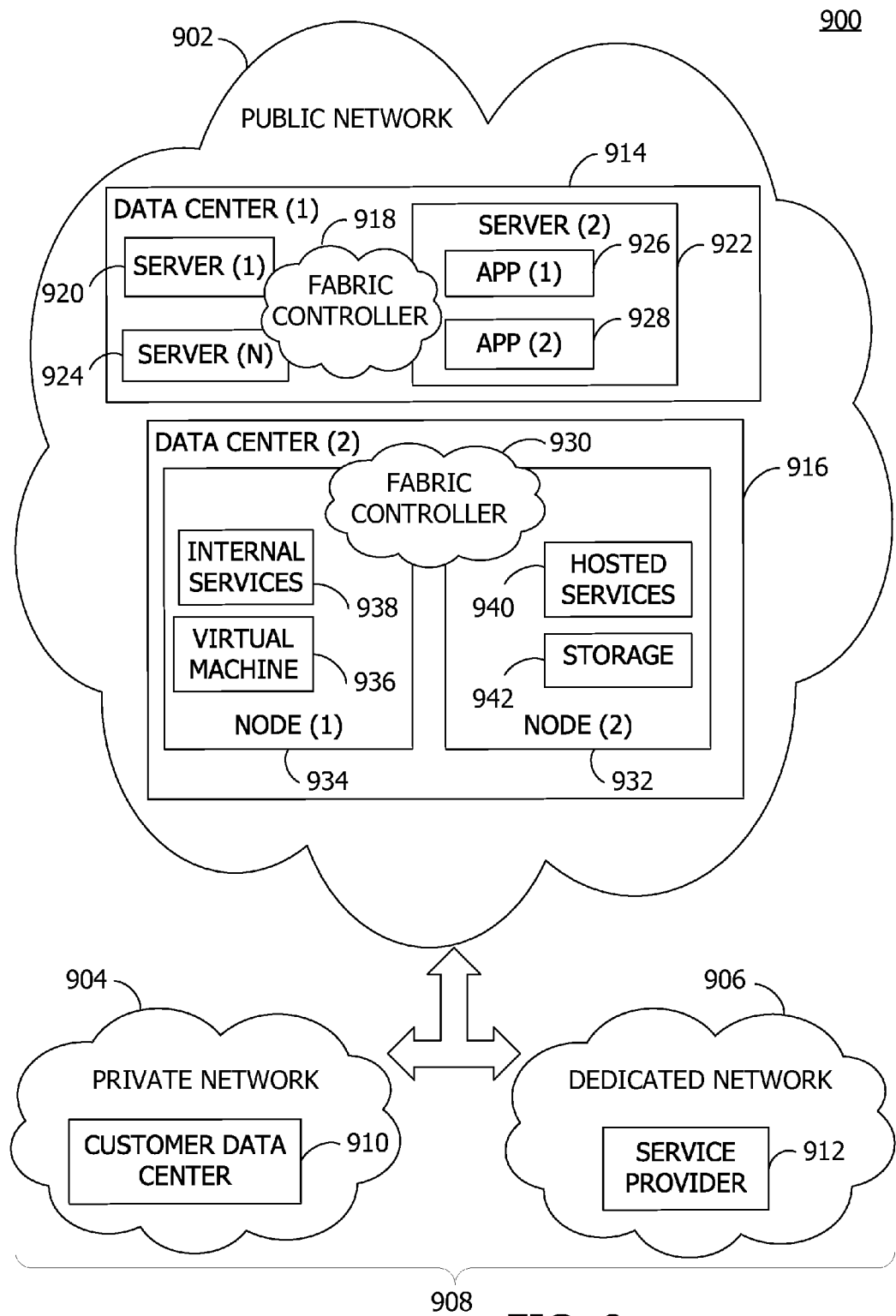
FIG. 9 is an exemplary block diagram illustrating a cloud computing environment for generating an application using a template.

With regard to FIG. 9, an exemplary block diagram illustrates a cloud-computing environment for application development. Architecture 900 illustrates an exemplary cloud-computing infrastructure, suitable for use in implementing aspects of the disclosure. Architecture 900 should not be interpreted as having any dependency or requirement related to any single component or combination of components illustrated therein. In addition, any number of nodes, virtual machines, data centers, role instances, or combinations thereof may be employed to achieve the desired functionality within the scope of examples of the present disclosure.

The distributed computing environment of FIG. 9 includes a public network 902, a private network 904, and a dedicated network 906. Public network 902 may be a public cloud, for example. Private network 904 may be a private enterprise network or private cloud, while dedicated network 906 may be a third party network or dedicated cloud. In this example, private network 904 may host a customer data center 910, and dedicated network 906 may host an internet service provider 912. Hybrid cloud 908 may include any combination of public network 902, private network 904, and dedicated network 906. For example, dedicated network 906 may be optional, with hybrid cloud 908 comprised of public network 902 and private network 904.

Public network 902 may include data centers configured to host and support operations, including tasks of a distributed application, according to the fabric controller 918. It will be understood and appreciated that data center 914 and data center 916 shown in FIG. 9 is merely an example of one suitable implementation for accommodating one or more distributed applications and is not intended to suggest any limitation as to the scope of use or functionality of examples of the present disclosure. Neither should data center 914 and data center 916 be interpreted as having any dependency or requirement related to any single resource, combination of resources, combination of servers (e.g. server 920, server 922, and server 924) combination of nodes (e.g., nodes 932 and 934), or set of APIs to access the resources, servers, and/or nodes.

Data center 914 illustrates a data center comprising a plurality of servers, such as server 920, server 922, and server 924. A fabric controller 918 is responsible for automatically managing the servers and distributing tasks and other resources within the data center 914. By way of example, the fabric controller 918 may rely on a service model (e.g., designed by a customer that owns the distributed application) to provide guidance on how, where, and when to configure server 922 and how, where, and when to place application 926 and application 928 thereon. In one example, one or more role instances of a distributed application may be placed on one or more of the servers of data center 914, where the one or more role instances may represent the portions of software, component programs, or instances of roles that participate in the distributed application. In another example, one or more of the role instances may represent stored data that is accessible to the distributed application.

Data center 916 illustrates a data center comprising a plurality of nodes, such as node 932 and node 934. One or more virtual machines may run on nodes of data center 916, such as virtual machine 936 of node 934 for example. Although FIG. 9 depicts a single virtual node on a single node of data center 916, any number of virtual nodes may be implemented on any number of nodes of the data center in accordance with illustrative examples of the disclosure. Generally, virtual machine 936 is allocated to role instances of a distributed application, or service application, based on demands (e.g., amount of processing load) placed on the distributed application. As used herein, the phrase "virtual machine" is not meant to be limiting, and may refer to any software, application, operating system, or program that is executed by a processing unit to underlie the functionality of the role instances allocated thereto. Further, the virtual machine 936 may include processing capacity, storage locations, and other assets within the data center 916 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 930 is responsible for automatically managing the virtual machines running on the nodes of data center 916 and for placing the role instances and other resources (e.g., software components) within the data center 916. By way of example, the fabric controller 930 may rely on a service model (e.g., designed by a customer that owns the service application) to provide guidance on how, where, and when to configure the virtual machines, such as virtual machine 936, and how, where, and when to place the role instances thereon.

As discussed above, the virtual machines may be dynamically established and configured within one or more nodes of a data center. As illustrated herein, node 932 and node 934 may be any form of computing devices, such as, for example, a personal computer, a desktop computer, a laptop computer, a mobile device, a consumer electronic device, server(s), the computing device 100 of FIG. 1, and the like. In one instance, the nodes host and support the operations of the virtual machines, while simultaneously hosting other virtual machines carved out for supporting other tenants of the data center 916, such as internal services 938 and hosted services 940. Often, the role instances may include endpoints of distinct service applications owned by different customers.

Typically, each of the nodes include, or is linked to, some form of a computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer-readable medium (e.g., computer storage media and communication media) accommodated by each of the nodes.

The role instances that reside on the nodes support operation of service applications, and may be interconnected via application programming interfaces (APIs). In one instance, one or more of these interconnections may be established via a network cloud, such as public network 902. The network cloud serves to interconnect resources, such as the role instances, which may be distributably placed across various physical hosts, such as nodes 932 and 934. In addition, the network cloud facilitates communication over channels connecting the role instances of the service applications running in the data center 916. By way of example, the network cloud may include, without limitation, one or more local area networks (LANs) and/or wide area networks (WANs). Such networking environments are commonplace in offices, enterprise-wide computer networks, intranets, and the Internet. Accordingly, the network is not further described herein.

The examples illustrated and described herein as well as examples not specifically described herein but within the scope of aspects of the disclosure constitute exemplary means for automatically generating an application from a template. For example, the elements illustrated in FIG. 1 and FIG. 2, such as when encoded to perform the operations illustrated in FIG. 4 and FIG. 5, constitute exemplary means for receiving a selection of a template, exemplary means for receiving source data, and exemplary means for determining a portion of the source data to extract and store at an identified location when automatically generating an application from the template.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method for generating an application in a developer environment, the method comprising:
　　receiving a selection of a template at a design surface implemented on a user interface, the template including a data schema;
　　receiving a set of data for the selected template;
　　binding the set of data to the selected template based on the data schema;
　　identifying at least a portion of the set of data for extraction;
　　inferring a user intent based on at least one of past user interactions or past user selections associated with the developer environment, a data storage location match for a type of data corresponding to the set of data, or telemetry data;
　　inferring a location for the identified portion of the set of data based on the inferred user intent;

extracting the identified portion of the set of data;
storing the extracted data at the inferred location; and
binding the extracted data at the inferred location to the template, such that access to the template provides access to the extracted data at the inferred location.

2. The method of claim 1, wherein identifying the portion of the set of data for extraction further comprises:
identifying one or more data types from the set of data, the one or more data types including at least one of local data, dynamic data, or remote data.

3. The method of claim 1, wherein identifying the portion of the set of data for extraction further comprises:
identifying at least a portion of dynamic data based on rules associated with the data schema.

4. The method of claim 1, wherein the portion of the set of data for extraction is identified based at least in part on telemetry data.

5. The method of claim 1, further comprising:
receiving the inferred location for the identified portion of the set of data;
identifying one or more other locations for data storage;
providing the inferred location and the one or more other locations as a connections list;
receiving a selection of a first location for a first subset of the identified portion of the set of data;
receiving another selection of a second location for a second subset of the identified portion of the set of data; and
storing the first subset at the first location and the second subset at the second location.

6. The method of claim 1, wherein identifying the portion of the set of data for extraction further comprises:
identifying one or more available data storage locations based on a user profile;
providing the one or more available data storage locations as a connections list; and
receiving a selection of a location from the connections list, the selected location used as the inferred location.

7. The method of claim 6, wherein providing the one or more locations as the connections list further comprises:
identifying a default location from the one or more locations based at least in part on a set of policies; and
providing the default location as a suggested location in the connections list.

8. A system for generating an application, the system comprising:
a developer environment, implemented on a processor, configured to receive a template and source data, the template including a data schema;
a data binding mechanism, coupled to the developer environment, configured to bind the source data to the template based on the data schema and a set of policies;
a data storage location mechanism, coupled to the developer environment, configured to identify one or more data storage locations; and
a data extraction mechanism, coupled to the developer environment, configured to identify at least a portion of the source data to extract from the template, infer a user intent based on at least one of past user interactions, past user selections, or telemetry data corresponding to the developer environment, infer at least one data storage location of the identified one or more data storage locations for storage of the extracted portion of the source data based on the inferred user intent, and store the extracted portion of the source data to the at least one inferred data storage location, the data binding mechanism re-binding the extracted portion of the source data stored at the at least one inferred data storage location to the template.

9. The system of claim 8, wherein the data storage location mechanism provides the one or more identified data storage locations as a connections list to the developer environment.

10. The system of claim 9, wherein the data storage location mechanism identifies a default storage location from the one or more identified data storage locations and provides the default storage location as a suggested storage location in the connections list.

11. The system of claim 8, further comprising:
a template library including a number of templates, an individual template of the number of templates comprising a document and a data schema.

12. The system of claim 8, wherein the source data comprises at least one of local data, dynamic data, and remote data.

13. The system of claim 12, wherein the data extraction mechanism identifies at least a portion of the source data as the local data and maintains storage of the identified local data at the template.

14. The system of claim 12, wherein the data extraction mechanism identifies at least a portion of the source data as the remote data stored at a remote location and maintains the storage of the remote data at the remote location.

15. The system of claim 12, wherein the data extraction mechanism identifies at least a portion of the source data as the dynamic data and extracts the dynamic data to store at a shared data storage location.

16. One or more computer storage media having computer-executable instructions stored thereon for generating an application in a developer environment, which, on execution by a computer, cause the computer to perform operations comprising:
receiving a template and source data, the template including a data schema and a set of policies;
identifying one or more data storage locations based at least in part on user credentials;
identifying at least a portion of the source data for extraction based at least in part on a data type;
inferring a user intent based on at least one of historical user interactions, historical user selections, a data storage location match for the data type, or telemetry data;
inferring at least one data storage location of the identified one or more data storage locations for storage of the identified portion based on the inferred user intent;
extracting the identified portion;
storing the extracted portion at the at least one inferred data storage location; and binding the extracted portion stored at the at least one inferred data storage location to the template.

17. The one or more computer storage media of claim 16, wherein the data type is at least one of local data, dynamic data, or remote data.

18. The one or more computer storage media of claim 16, wherein the portion of the source data for extraction is identified based at least in part on the set of policies.

19. The one or more computer storage media of claim 16, wherein the one or more identified storage locations are provided as a connections list to the developer environment.

20. The one or more computer storage media of claim 19, wherein the developer environment receives a selection of at least one identified location for storage of the extracted portion of the source data as a user selection from the connections list.

* * * * *